(12) United States Patent
Falls et al.

(10) Patent No.: US 6,247,149 B1
(45) Date of Patent: *Jun. 12, 2001

(54) DISTRIBUTED DIAGNOSTIC LOGGING SYSTEM

(75) Inventors: Patrick Terence Falls, Berks; Neil Thompson, Wilts, both of (GB)

(73) Assignee: Novell, Inc., Provo, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/959,429

(22) Filed: Oct. 28, 1997

(51) Int. Cl.[7] .................................................. G06F 11/00
(52) U.S. Cl. ............................................................. 714/45
(58) Field of Search .................................. 714/45, 25, 47, 714/48; 709/224, 203

(56) References Cited

U.S. PATENT DOCUMENTS

| 4,525,789 |   | 7/1985  | Kemper et al. .          |
|-----------|---|---------|--------------------------|
| 4,545,011 |   | 10/1985 | Lyon et al. .            |
| 4,888,726 |   | 12/1989 | Struger et al. .         |
| 5,245,615 |   | 9/1993  | Treu .                   |
| 5,361,347 |   | 11/1994 | Glider et al. .          |
| 5,426,421 |   | 6/1995  | Gray .                   |
| 5,452,447 | * | 9/1995  | Nelson et al. ... 395/650|
| 5,463,735 |   | 10/1995 | Pascucci et al. .        |
| 5,491,791 |   | 2/1996  | Glowny et al. .          |
| 5,495,607 |   | 2/1996  | Pisello et al. .         |
| 5,522,044 |   | 5/1996  | Pascucci et al. .        |
| 5,630,049 | * | 5/1997  | Cardoza et al ... 395/183.01 |
| 5,642,478 | * | 6/1997  | Chen et al. ... 395/183.21 |
| 5,801,702 | * | 9/1998  | Dolan et al. ... 345/357 |
| 5,805,809 | * | 9/1998  | Singh et al. ... 395/200.33 |
| 5,809,298 | * | 9/1998  | Nakada ... 395/615       |
| 5,819,094 | * | 10/1998 | Sata et al. ... 395/704  |
| 5,845,080 | * | 12/1998 | Hamada et al. ... 395/200.54 |
| 5,847,972 | * | 12/1998 | Eick et al. ... 364/408  |
| 5,924,096 | * | 7/1999  | Draper et al. ... 707/10 |
| 5,966,706 | * | 10/1999 | Biliris et al. ... 707/10 |

OTHER PUBLICATIONS

Stratman, Robert H., Development of an Integrated Network Manager for Heterogeneous Networks Using OSI Standards and Object–Oriented Techniques, IEEE Journal on Selected Areas in Communication, vol. 2, No. 6, Aug. 1994, pp. 1110–1120.*

(List continued on next page.)

*Primary Examiner*—Robert Beausoleil
*Assistant Examiner*—Bryce P. Bonzo
(74) *Attorney, Agent, or Firm*—Dinsmore & Shohl

(57) ABSTRACT

A distributed logging system for maintaining and retrieving diagnostic logging information in an efficient manner. A local cache of logging information is maintained at an analysis computer and the local cache is first examined to determine if diagnostic information exists in the cache or if it must be retrieved from a remote server. If the requested diagnostic information is available in the local cache, the local cache is accessed to retrieve the information. If any portion of the requested diagnostic information is not available in the local cache, the information is located and read from the appropriate log file(s) on the remote server, and then stored in the local cache so that subsequent requests for that diagnostic information will not necessitate accessing the remote computer. Native I/O functions are used to allow access to the diagnostic information regardless of the status of the distributed system.

20 Claims, 10 Drawing Sheets

OTHER PUBLICATIONS

Mansouri–Samani, Masoud and Sloman, Morris, Monitoring Distributed Systems, IEEE Network, Nov. 1993, pp. 20–30.*

Mansouri–Samani, et al., *Monitoring Distributed Systems* pp. 20–30, IEEE Network, Nov., 1993.

Wood, et al., *Fremont: A System for Discovering Network Characteristics and Problems* pp. 335–346. USENIX. Jan., 1993.

Tierney, et al., *Performance Analysis in High–Speed Wide Area IP–over–ATM Networks: Top–to–Bottom End–to–End Monitoring* pp. 26–39, IEEE Network, May/Jun. 1996.

Kislitzin, Katy, *Network Monitoring by Scripts*, pp. 101–105, USENIX, Fall, 1990.

Fowler, et al., *A User–Level Replicated File System* pp. 279–289, USENIX, Jun. 1993.

Wuu, et al., *Efficient Solutions to the Replicated Log and Dictionary Problems* pp. 57–66, ACM Operating Systems Review, Jan., 1986.

Madruga, et al., *Fault Management Tools for a Cooperative and Decentralized Network Operations Environment* pp. 1121–1130, IEEE Journal, Aug., 1994.

Pierce, Clinton. *The Igor System Administration Tool* pp. 9–18, LISA X, Sep., 1996.

Peacock, et al., *Big Brother: A Network Services Expert*, pp. 393–398, USENIX, Jun. 1988.*

Harrison, et al., *Pong: A Flexible Network Services Monitoring System* pp. 167–173, LISA, Sep., 1994.*

Dawson, et al., *Probing and Fault Injection of Protocol Implementations,* pp. 351–359, IEEE Int'l Conf. on Distributed Computing Systems, 1995.*

DeSimone, et al. *Sysctl: A Distributed System Control Package* pp. 131–143, LISA, Nov., 1993.*

Chillarege, Ram, *Software Probes and a Self–Testing System—for Failure Detection and Diagnosis* pp. 1–11. IBM, Jan., 1993.*

Novell, Inc., *DataClub Administrator's Guide, NETWARE,* pp. cover pages, iii–vi, 1–16, Jul., 1992.*

Novell, Inc., Data Club Reference Card, 1992.*

BackOffice Magazine, coverpage and advertisement—*Unleash the Hidden Power of SMS* Dec., 1996.*

Brendan, et al., *Striping Within the Network Subsystem,* pp. 22–29, IEEE Network, Jul./Aug., 1995.*

Stratman, Robert, Development of an Integrated Network Management Heterogeneous Networks Using OSI Standards and Object–Oriented Techniques pp. 1110–1120, IEEE Journal, Aug. 1994.

Comer, ety al., Probing TCP Implementations pp. 245–255, USENIX, Jun., 1994.

Peacock, et al., Big Brother: A Network Services Espert, pp. 393–398, USENIX, jUN. 1988.

* cited by examiner

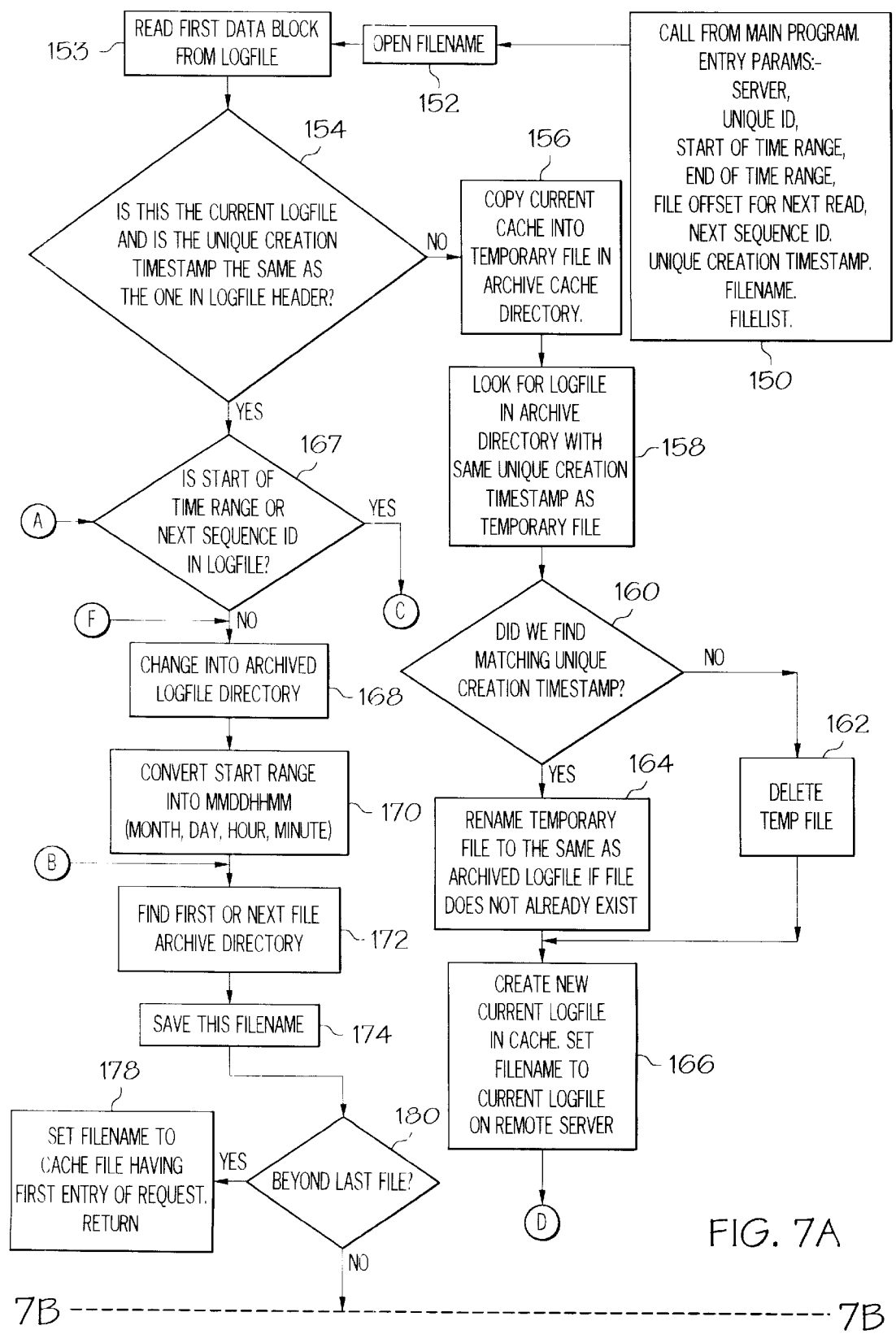

DISTRIBUTED DIAGNOSTIC LOGGING SYSTEM

FIELD OF THE INVENTION

This invention relates generally to generating and accessing diagnostic logging information, and in particular relates to maintaining and accessing diagnostic logging information associated with a distributed system such as electronic mail, directory services, or the like.

BACKGROUND OF THE INVENTION

Locating problems, or "bugs" in software can be very time-consuming and expensive because of the inherent complexity of software. To reduce the time required to "debug" software, complex software systems frequently include the ability to continuously or intermittently create diagnostic logging information that provides information about the internal processes of the software. Such diagnostic information is typically written to a file where it can be analyzed with the appropriate tools to help in determining what caused the software to malfunction. Such a tool typically retrieves the logging information from a log file, formats the logging information, and displays the logging information on a computer monitor where it can be analyzed by a software technician. Because a large amount of diagnostic information can be generated, the software technician typically requests diagnostic information which was logged during the time range in which the problem occurred, and the analyzing tool extracts from the log file those log records that fall within the requested time range.

One category of complex software systems relates to distributed systems which operate in a network environment. Distributed systems typically have tasks that execute simultaneously on different network servers. Some distributed systems are referred to as disconnectable distributed systems, and include, for example, electronic mail systems, distributed directory services, management services, replicated file systems, and replicated databases. The term "disconnectable" is used to indicate that the communication paths between the various distributed tasks may be very slow, or may even be disconnected. This can occur because the communications links between servers may be relatively slow and/or unreliable, or because the software itself is inoperable at a particular time.

Some distributed systems include the ability to generate diagnostic logging information which can be used to debug software problems. Typically each task in the distributed system maintains one or more log files on the network server on which it runs. However, the log files are typically analyzed on a local computer, which may be connected to the network server via a relatively slow communications path, where the technical staff is located. To access the diagnostic logging information from the local computer, the diagnostic information is transferred from the network server to the local computer. Frequently the transfer of log file information over relatively slow Wide Area Network (WAN) communication lines can lead to significant delay in receiving the log file information. Moreover, conventional log file analysis tools typically must interact with the distributed system on the remote server to acquire the diagnostic information. No analysis is possible if the distributed system is unavailable.

Consequently, analyzing log files generated by a distributed system can be frustrated by long data transfer delays, and may even be temporarily impossible if the distributed system is unavailable. Moreover, it is common to access the same diagnostic information in log files repeatedly when analyzing software problems. In conventional logging systems, such diagnostic information must be transferred over the network to the computer on which the analysis tool is running each time the information is requested.

It is apparent that a diagnostic logging system which enables access to the diagnostic logging information regardless of whether the distributed system is available, and which eliminates the need to repetitively transfer the same diagnostic information over relatively slow WAN links would be desirable.

SUMMARY OF THE INVENTION

It is one object of this invention to provide a distributed diagnostic logging system which enables access to diagnostic logging information regardless of the state of the distributed system.

It is another object of this invention to provide a diagnostic logging system which eliminates the need to transfer diagnostic logging information over a relatively slow communications path each time the log file information is accessed by a log file analysis tool.

It is still another object of this invention to provide a diagnostic logging system which maintains diagnostic logging information in a local persistent cache to eliminate delay in accessing the logging information.

Additional objects, advantages and other novel features of the invention will be set forth in part in the description that follows and, in part, will become apparent to those skilled in the art upon examination of the invention. To achieve the foregoing and other objects and in accordance with the purposes of the present invention as described above, a distributed diagnostic logging system is provided for obtaining logging information from one or more of a plurality of remote computers. An analysis tool running on a local computer receives a request from a user to obtain diagnostic logging information relating to a remote computer based on a first criteria. The analysis tool determines if at least a portion of the requested logging information exists in a cache associated with the local computer. If a portion of the requested logging information does exist in the cache, the analysis tool retrieves the diagnostic logging information from the cache. All portions of the requested diagnostic logging information which do not exist in the cache are obtained from the remote computers. The diagnostic logging information retrieved from the remote computers is stored in the cache so that subsequent requests to obtain the respective logging information can be satisfied by accessing the cache rather than the remote computer. The analysis tool formats and displays the diagnostic information to the user.

The distributed logging system according to this invention uses native input/output (I/O) routines to access logging information on remote computers so such information can be retrieved regardless of the state of the distributed system. Each remote computer maintains current diagnostic information in a current log file and historical diagnostic information in one or more archive log files. The archive log files preferably have a naming convention that identifies the date and time that the log file was transitioned from a current log file to an archive log file. The analysis tool can analyze the names of the archive log files to determine in which archive log file the requested diagnostic information exists.

Requested diagnostic logging information is communicated from the remote server(s) to the local computer, where it is stored in a cache. The cache can either be coupled directly to the local computer, or can be maintained on a local server accessible by the local computer over a relatively high speed local area network link. Subsequent requests to obtain access to the same, or a subset, of the diagnostic logging information are satisfied by retrieving the information from the cache, eliminating the need to repeatedly transfer the same diagnostic information over the relatively slow wide area network link.

The cache includes log files with names (or paths) that identify the remote computer from which the diagnostic information was retrieved. The cache can include current and archive log files which correspond to respective files on the remote computer(s). Each log file is initially created in the cache to be of sufficient length to hold the diagnostic information associated with that request at the same relative offset in the cache log file as in the log file to which it corresponds on the remote computer. As diagnostic information is periodically moved from a remote computer to a cache log file, the cache log file will be extended as necessary. The requested diagnostic information is maintained in the cache log file at the same relative offset within the log file as it exists on the remote computer log file.

The distributed diagnostic logging system according to this invention eliminates the typical high latency time required to retrieve diagnostic information from remote computers, by maintaining previously requested diagnostic information in a local cache. Native I/O procedures are used, to allow the analysis of diagnostic information regardless of the state of the distributed system.

Still other objects of the present invention will become apparent to those skilled in this art from the following description wherein there is shown and described preferred embodiments of this invention. As will be realized, the invention is capable of other different obvious aspects all without departing from the invention. Accordingly, the drawings and description will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIGS. 7A–7C are a flow diagram illustrating a method for obtaining diagnostic logging information from a remote computer.

Reference will now be made in detail to present preferred embodiments of the invention, examples of which are illustrated in the accompanying drawings, wherein like numerals indicate the same elements throughout the views.

DETAILED DESCRIPTION

Figure 1:
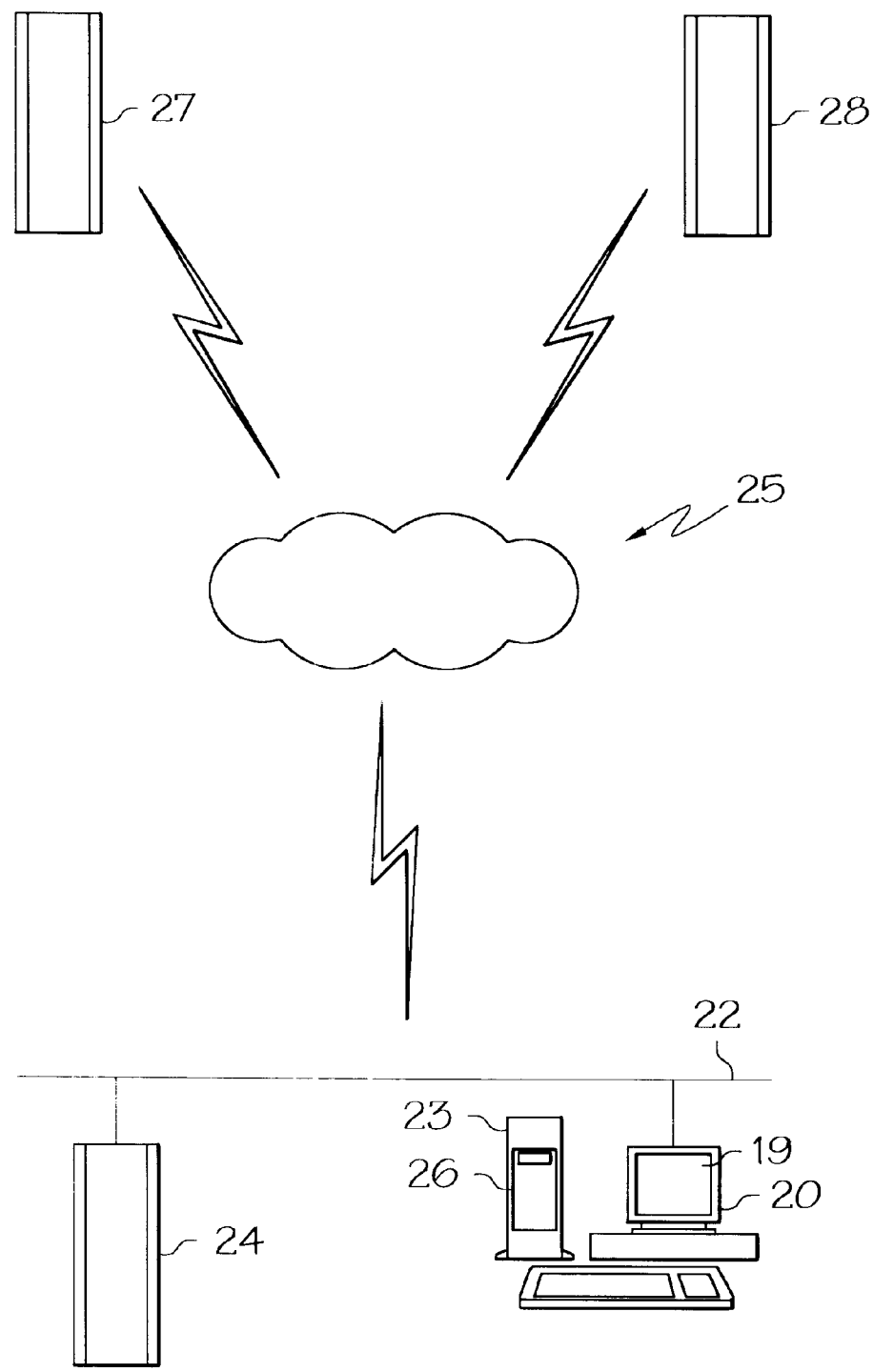
FIG. 1 is a schematic diagram of a distributed diagnostic logging system, according to one embodiment of this invention.

Referring now to FIG. 1, a distributed logging system according to one embodiment of this invention is shown. Remote computers, or servers, 27 and 28 each execute a task of a distributed system, such as an electronic mail system, a distributed directory service, a replicated file system, or the like. The tasks of the distributed system running on servers 27, 28, respectively, generate and write diagnostic information regarding the internal state of the software to a log file contained on the respective server. Wide area network (WAN) 25 can comprise any suitable communications link for accessing computers over a large geographic area, such as via T1 lines, or the like. A local computer 20 is coupled to a local area network (LAN) 22 and can communicate with servers 27,28 via WAN 25, and is in communication with a local server 24 via LAN 22.

A log file analysis tool 19 executes on computer 20 for retrieving and analyzing the diagnostic logging information generated by the distributed processes on servers 27, 28. To access such information, at least initially, computer 20 requests the diagnostic data from the respective server 27 or 28 over WAN 25. As is understood to those skilled in the art, data transfer over WAN communication links are slower than data transfer between a computer and a disk drive coupled to the computer. Thus, there will be a delay, and in some circumstances a long delay, as analysis tool 19 waits for the information to be transferred from server 27 or 28. According to the present invention, once such diagnostic information is initially transferred to local computer 20, it is stored, or cached, in cache 26 on a local persistent storage device. The local persistent storage device can be coupled directly to computer 20, such as on disk 23, or can be stored on a local server, such as server 24, which is accessible over a relatively fast communications path, such as LAN 22. As will be appreciated, as long as the communications path between computer 20 and cache 26 is faster than the communications path between computer 20 and remote server 27, 28, caching such information will result in improved access time. Moreover, diagnostic data maintained in cache 26 can be accessed and analyzed regardless of the state of the connection between computer 20 and a remote server. Maintaining the logging information in cache 26 also greatly reduces network load over WAN 25 by eliminating subsequent transfers of the same data.

The distributed logging system according to this invention preferably uses native operating system I/O routines for reading the diagnostic information from remote servers 27, 28, so such information can be retrieved regardless of whether the distributed service is available.

Figure 2:
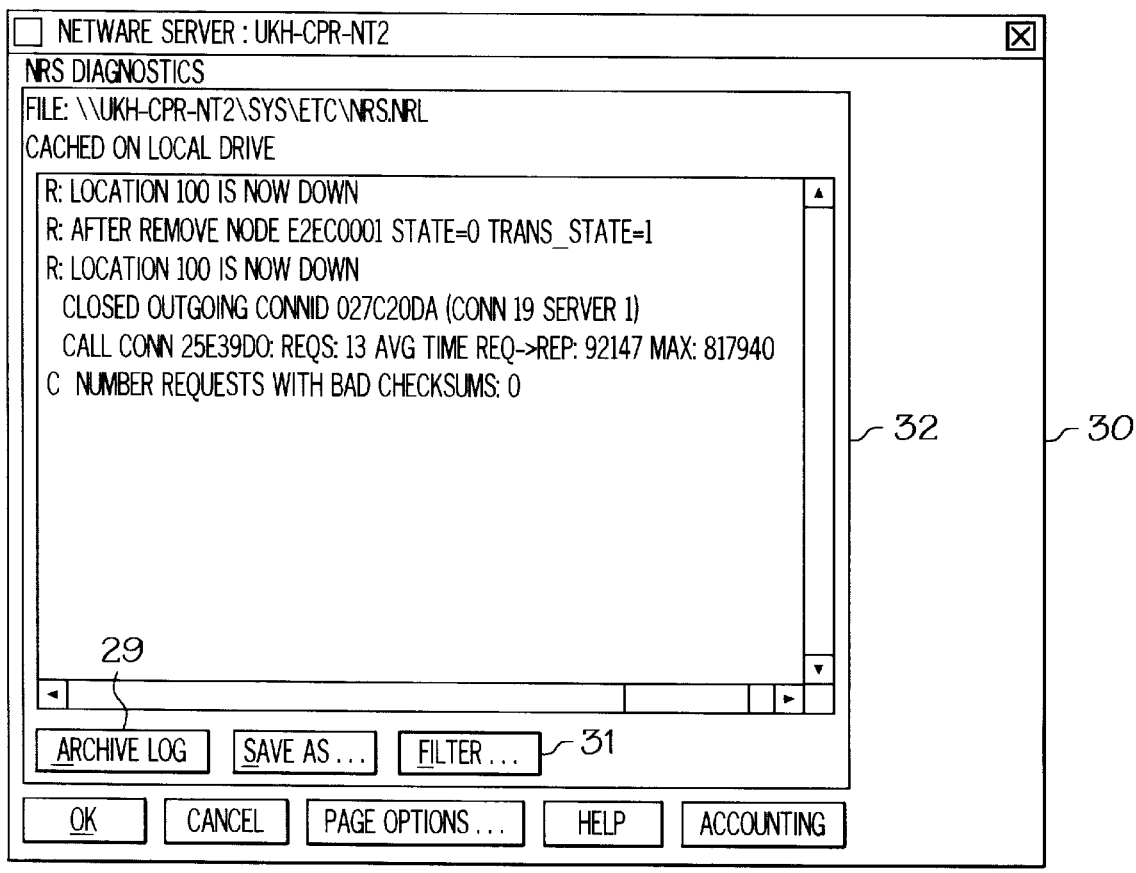
FIG. 2 is a user interface window suitable for displaying diagnostic logging information from remote log files.

For ease of use, log file analysis tool 19 preferably initially displays a plurality of icons representing the various remote servers on the network. An administrator or software technician can use a selection device, such as a mouse, to select the icon corresponding to the remote server for which analysis is desired. Upon selection of the appropriate icon, window 30 as shown in FIG. 2 can be displayed. By default, log file analysis tool 19 analyzes the local persistent cache to obtain the most recent cached entries for the selected server, and such entries are unpacked and displayed in window 32. It is apparent, however, that the default behavior of analysis tool 19 can be implementation specific, and could differ among different implementations. Button 29 can be selected to force the closure of the current log file on a remote server, and transition the log file to an archive log file.

Figure 3:
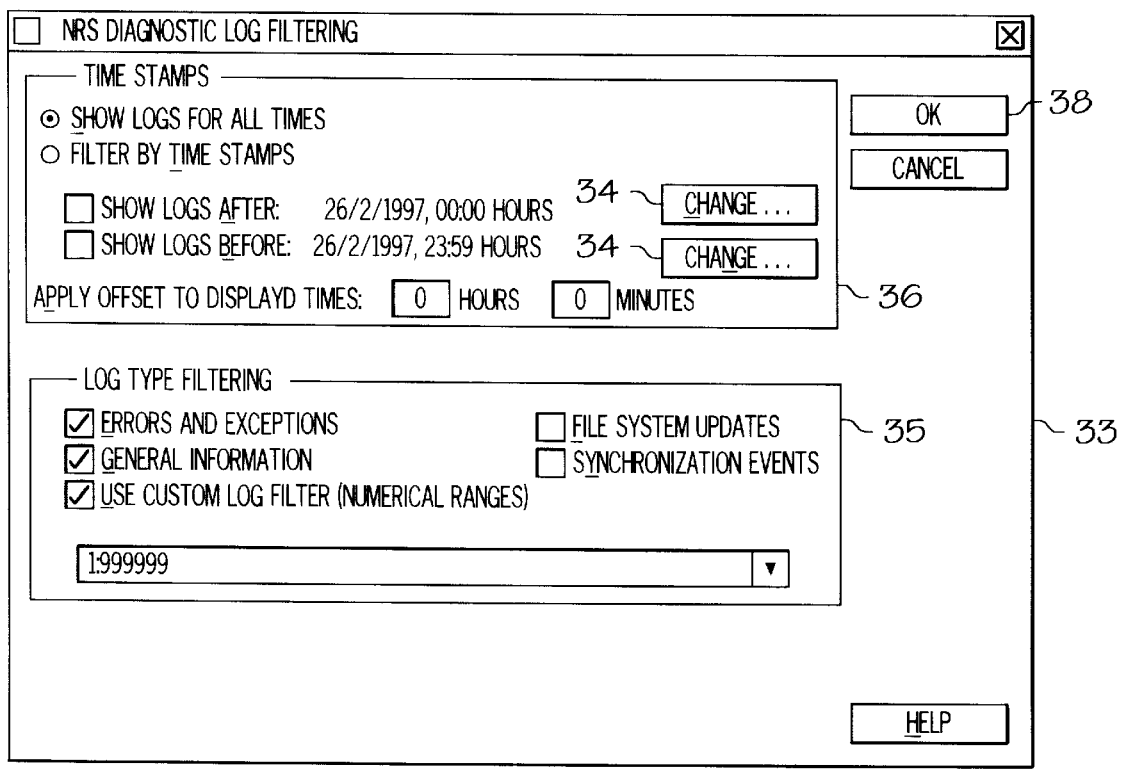
FIG. 3 is a user interface window suitable for specifying particular diagnostic logging information to analyze.

If the administrator seeks diagnostic information other than that initially displayed in window 32, button 31 is activated to cause the display of window 33, as shown in FIG. 3. Box 36 contains radio buttons and other selection fields to allow the administrator to request the desired log records by specifying a time range of interest. If the initially displayed default time range is unacceptable, buttons 34 can be selected to indicate a different time range. It is apparent that criteria other than time could be used in the selection of log entries, such as the type of log record, or other such attributes. Box 35 allows the administrator to specify that of those records that fall within the specified time range, only certain types of log records should be displayed. Upon activation of button 38, analysis tool 19 obtains the log records that fall within the specified time range, unpacks the log records, and displays in window 32 of FIG. 2 the diagnostic information that falls within the filtering criteria specified in window 35.

Some of the information displayed in window 32 (FIG. 2) comprises string constants. To reduce log file size, "token IDs" are used in the log entries (log records) to represent such string constants. Each token ID has a unique value and is associated with a particular message string. Analysis tool 19 accesses a dictionary containing the string constants to translate a token ID to the particular message string when unpacking the log file. The diagnostic information displayed in window 32 can be used to determine the internal state of the distributed system at various instances in time, including the state of the software and the values of various variables, as well as any other information logged by the distributed system.

Figure 4:
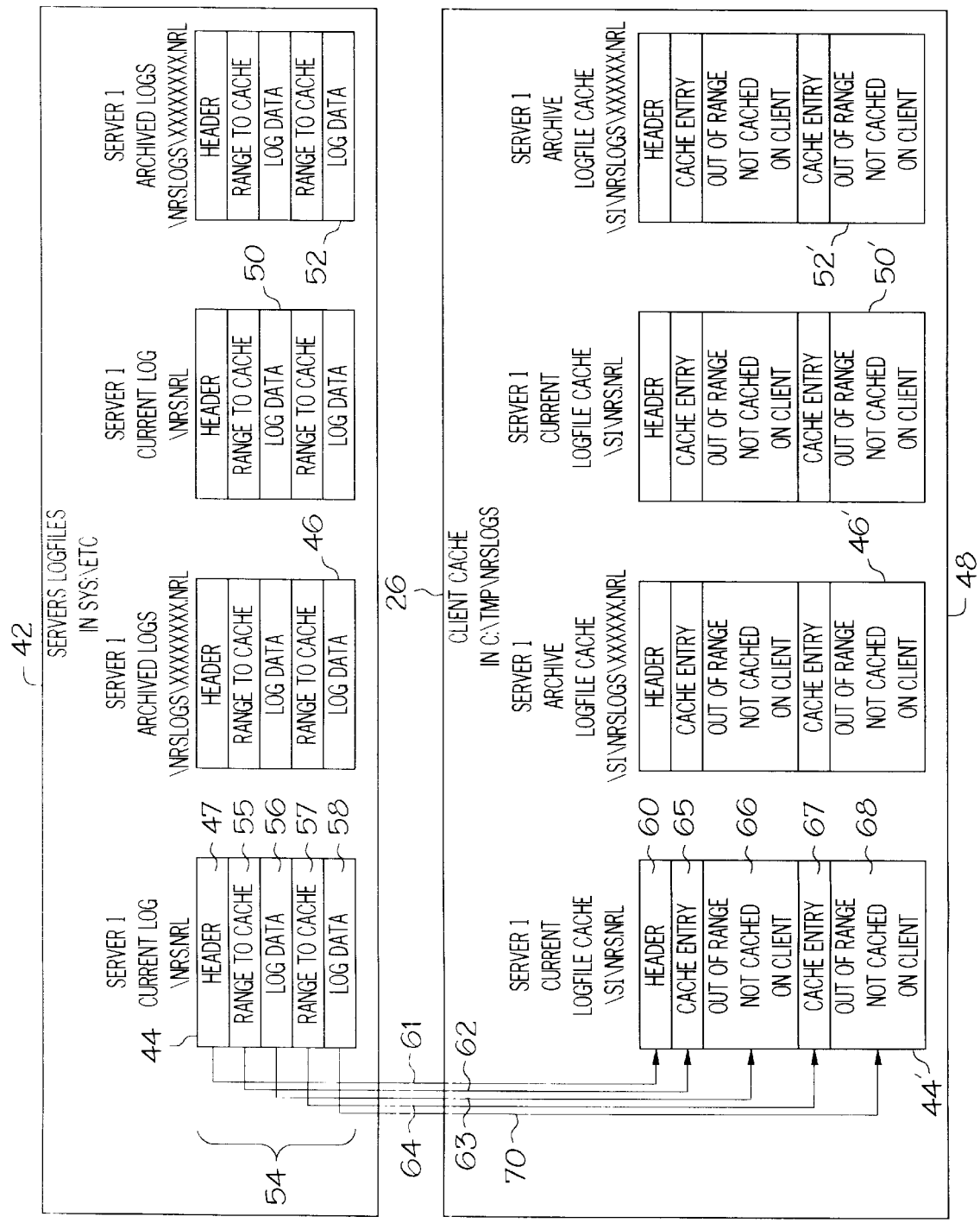
FIG. 4 is a block diagram illustrating the relationship between log files on a remote server and log files in a cache, according to one embodiment of this invention.

FIG. 4 is a block diagram illustrating the relationship of log files created by a distributed system on remote servers 27, 28 and the log files created in cache 26. FIG. 4 will be discussed with reference to the diagram shown in FIG. 1. Log file 44 is a log file created by the distributed system on server 27. Log file 44 contains a header record 47 which contains various fields of information relating to the log records (sometimes referred to herein as log entries) within log file 44. According to one embodiment of this invention, header 47 comprises the following fields:

TABLE 1

| | |
|---|---|
| 1. | globally unique location identifier |
| 2. | location name |
| 3. | unique creation timestamp |
| 4. | start log offset (used in circular log files) |
| 5. | next sequence ID |
| 6. | next offset in file |
| 7. | log entry ID ranges |

Fields 1 and 2 are used to identify the server on which the log file was generated. Field 3 is a unique timestamp recorded in the log file which indicates when the log file was initially created. Field 4 is an offset into the log file of the earliest log entry. This field is useful for "circular" log files. After a circular log file reaches a predetermined size, subsequent log entries are written over preexisting log entries. Thus, in a circular log file, the log entries at the beginning of a log file may be more recent than those at the end of the log file. Field 5 contains a sequential ID which is assigned to each log entry as it is written to the log file. Field 6 indicates where in the log file the next log entry will be written. Field 7 contains the ranges of log entry IDs which identify the types of log entries recorded in this log file. When specifying that diagnostic information is to be logged, an administrator can indicate one or more specific types of diagnostic information to capture. The identification of which type of information to capture is made by specifying ranges of log entry IDs.

For the sake of illustration, it will be assumed that diagnostic logging information has been previously obtained from each of log files 44, 46, 50 and 52 on remote servers 27, 28, and stored in cache 26. Consequently, cache log files 44', 46', 50' and 52' (which correspond respectively to log files 44, 46, 50 and 52) exist in cache 26. The relationship between log file 44 on remote server 27 and log file 44' in cache 26 is illustrated by arrows 61–64 and 70. Header 47 of log file 44 contains substantially the same information as contained in header 60 of log file 44'. The remainder of log file 44, indicated by bracket 54, contains log records, however some log records have been cached in log file 44', and other log records have not. Groups of log records in files 44, 46, 50 and 52 that have been cached are indicated by the words "range to cache," as indicated, for example, by log groups 55 and 57. Each log group contains at least one log record, and typically contains a plurality of log records. Those log groups indicated by the words "log data," such as log groups 56 and 58, have not yet been cached in log file 44'. Thus, cache entry 65 of log file 44' contains the same data (log records) as log group 55 of log file 44. Portion 66 of log file 44' does not contain any diagnostic data, but takes up the same amount of disk space as log group 56 of log file 44. If a user subsequently requests diagnostic information which is located in log group 56 of log file 44, analysis tool 19 will retrieve such information from log file 44 and store such information in portion 66 of log file 44' (and in the process, create a new cache entry). When a cache log file is first created, it is preferably created to be of sufficient size to store the cached log records associated with that request at the same offset in the cache log file as the log records exist in the log file on the remote server. As subsequent log entries are moved to the cache log file to satisfy subsequent requests, the log file is extended if necessary. If, however, a subsequent request causes log records to be moved to the cache file in a location, such as portion 66, which is already present because of a previous request, the file need not be extended.

Log file 46 of server 27 corresponds to log file 46' in cache 26, and log files 50, 52 associated with server 28 correspond to log files 50' and 52' in cache 26. A log file is created in cache 26 when analysis tool 19 accesses a log file on a remote server that does not already have a corresponding log file in cache 26. Upon access of the remote log file for the first time, a log file of sufficient size to hold the diagnostic data associated with the request is created in cache 26 and the requested diagnostic data is copied from the remote server log file to the corresponding log file in the cache. Such movement of data from the remote server to the cache is preferably transparent to the user of analysis tool 19.

When a log file on a remote server reaches a predetermined size, the diagnostic task executing on that server closes and stores the log file as an archive log file. In the process, the log file is preferably named such that the date and time when the file was closed is indicated in the filename. For example, the filename can be in a "mmddh-hmm" (month, date, hour, minute) format. Through the use of such a naming convention, analysis tool 19 need only examine the filename of the archive log files on a particular server to determine in which archive log file(s) the requested diagnostic information exists.

Each log file comprises a plurality of log records, with each log record identifying a specific logable event. The format of a log record according to one embodiment of this invention is as follows:

TABLE 2

| | |
|---|---|
| 1. | checksum and internal check data |
| 2. | log entry sequence ID |
| 3. | log entry ID |
| 4. | timestamp |
| 5. | logged parameters |

Field 1 contains a checksum to verify that information in the log record has not been corrupted. Field 2 is an optional field, and may contain a sequence ID which is particularly useful for circular log files. For circular log files, the sequence ID can be used to determine the relative age of the log records. Field 3 identifies the particular type of log record. Field 4 identifies the date and time when the log record was created. Field 5 contains whatever diagnostic data is suitable for the particular type of log record. The log record format is the same whether the log record exists on a remote server, or in the cache.

Groups of cached log records in cache 26 (referred to as a cache entry) are stored in a cache entry format to allow quick traversal through the various blocks of cached log records, such as cache entries 65 and 67. The cache entry format according to one embodiment of this invention, is as follows:

TABLE 3

| | |
|---|---|
| 1. | offset of next cache entry |
| 2. | length of this cache entry |
| 3. | first log record in this cache entry |
| 4. | second log record in this cache entry |
| 5. | nth log record in this cache entry |

A grouping, or block, of cached log entries, such as cache entry 65, is generated when such log entries are transferred from the remote server to the cache to satisfy a request to analyze the diagnostic information contained within such log entries. As a group of log entries is stored in the cache, a cache entry is generated, and has the format set forth in Table 3. Field 1 contains an offset to the next cache entry in that respective log file. For example, field 1 of cache entry 65 points to the offset of cache entry 67 within log file 44', as cache entry 67 is the next cache entry in log file 44'. Field 2 contains the length of the respective cache entry. Fields 3–5 are the actual log entries as copied from the remote server. Fields 1 and 2 allow analysis tool 19 to quickly traverse through the cache entries in a cache log file. If a new cache entry being created in log file 44' immediately follows a previously existing cache entry, field 2 of the previously existing cache entry is modified to include the size of the new cache entry, such that the previous cache entry and new cache entry will be combined into a single cache entry. If a new cache entry immediately precedes a previously existing cache entry, fields 1 and 2 of the previously existing cache entry are overwritten by the last log entry of the new cache entry, and field 2 of the new cache entry will include the size of the previously existing cache entry, again creating a single cache entry. If the first cache entry stored in a cache log file does not immediately follow the header, an "empty" cache entry is created and stored immediately after the header in which Field 1 of the cache entry contains the offset to the first cache entry which contains diagnostic data, and Field 2 is set to zero.

When a user requests diagnostic information which includes log entries that have been cached as well as log entries that have not been cached, analysis tool 19 extracts the cached log entries from cache 26 and retrieves the non-cached log entries from the respective log file on server 27 or 28, as appropriate. Analysis tool 19 then stores, or caches, the previously non-cached log entries to the respective cache log file so that a subsequent request for the same log entries can be satisfied entirely from cache 26, eliminating the relatively long transfer time of the data from a remote server.

Figure 5:
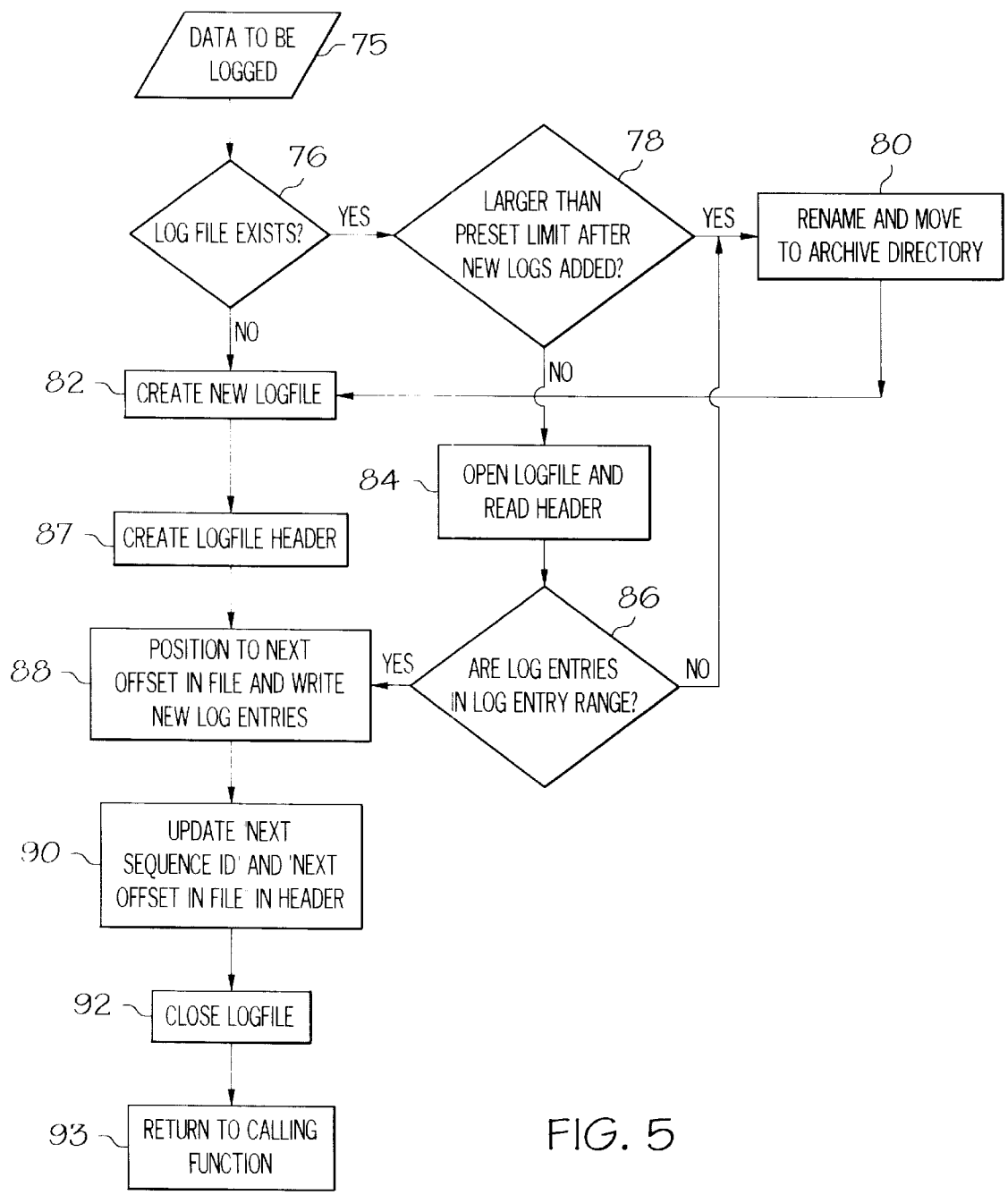
FIG. 5 is a flow diagram illustrating a method for writing diagnostic logging information to a log file.

FIG. 5 is a flow diagram illustrating a method for generating and writing log entries on remote server 27. This process describes the on-going creation and archival of log files by each distributed task. At block 75 data to be logged is generated on remote server 27. At block 76 the logging task determines whether a log file currently exists. If so, at block 78, the logging task determines whether the file length of the log file will exceed a predetermined length after the new diagnostic data has been added. If so, then at block 80 the existing log file is renamed and moved to an archive directory on the remote server. The name of the log file preferably includes date and time information indicating when the log file was archived. At block 82 a new log file is created. At block 87 a new log file header, having the header format described in Table 1, is created. If at block 78 it was not necessary to create a new log file, then at block 84 the existing log file is opened and the log file header is read. At block 86 it is determined whether the log entry IDs being logged to the existing log file are the same log entry IDs specified in the current configuration file for this server. If not, the current log file is closed and transitioned to an archive log file, and a new log file is created (blocks 80, 82, 87). This can happen when an administrator has changed the current configuration for this server and specified that a new range of log entry IDs are to be logged. If the log entry IDs have not changed, then at block 88 the log file is positioned to the next offset in the file (using "next offset in file" header field) and the new diagnostic data is written to the log file. At block 90 several fields in the log file header are updated. At block 92 the log file is closed. At block 93 the logging task returns to the calling process.

Figure 6A:
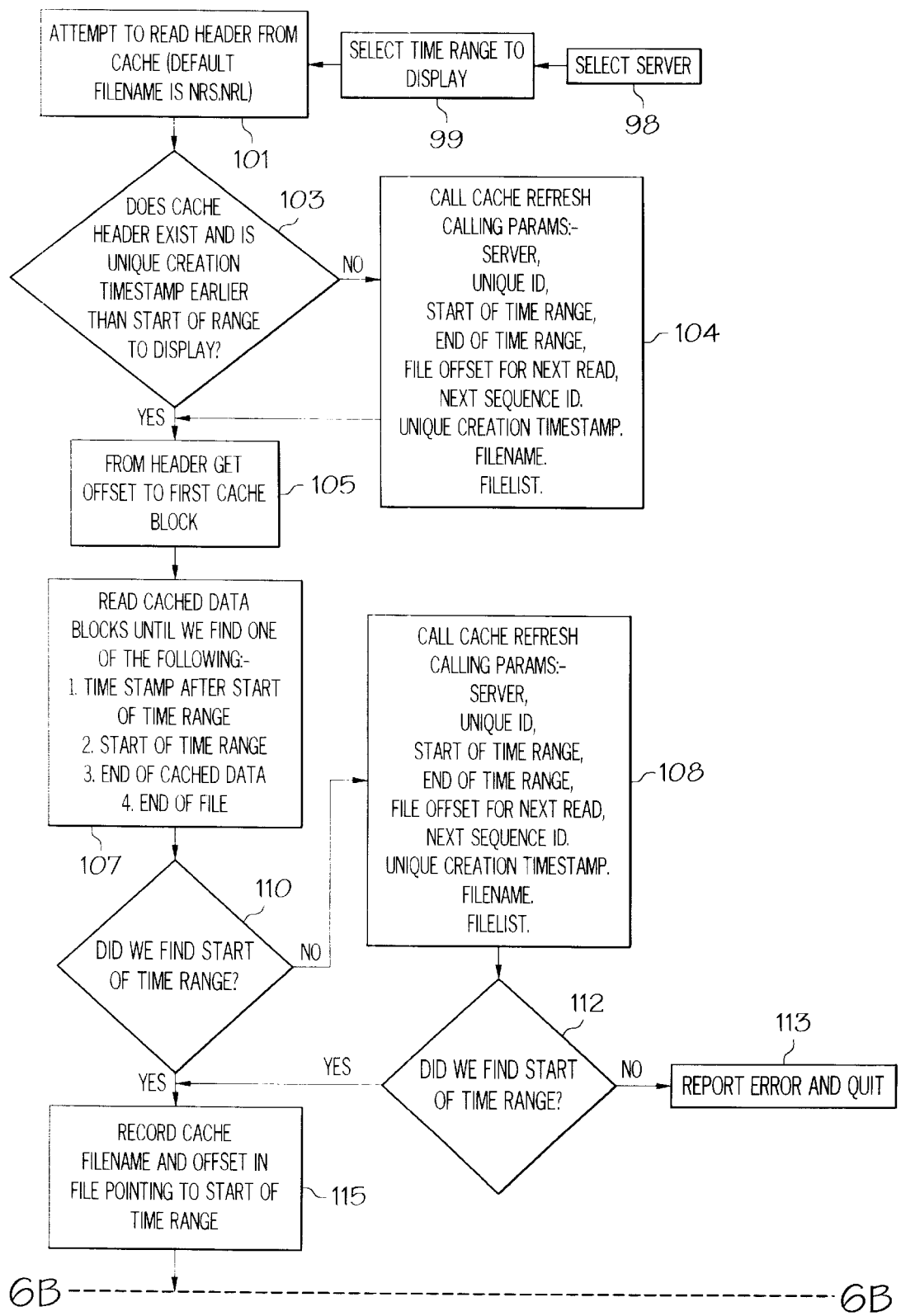
FIGS. 6A and 6B are a flow diagram illustrating a method for unpacking a log file from a cache, according to one embodiment of this invention.
Figure 6B:
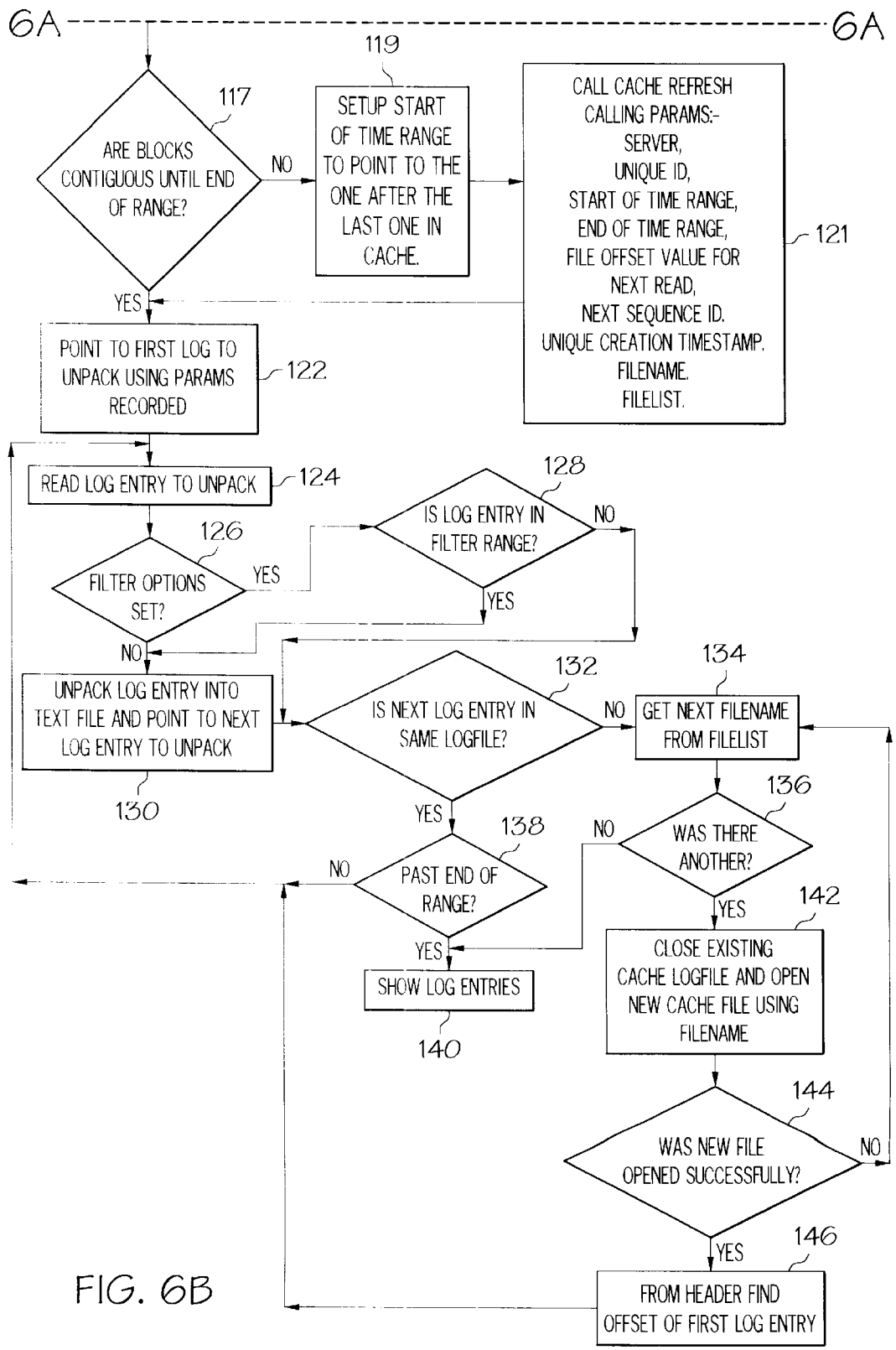

FIGS. 6A and 6B are a flow chart showing a process for "unpacking" a log file from cache 26 by a process running on a local computer 20, such as analysis tool 19. At blocks 98–99, one or more user interface windows are displayed to obtain from a user a particular server and a begin date/time and end date/time of log entries of interest. At block 101, analysis tool 19 attempts to read the log file header from the current log file in cache 26 associated with that remote server. If, at block 103, an error was received while attempting to read the header, or if the unique creation timestamp in the header is not earlier than the specified begin date/time, then at block 104, a cache refresh function is invoked to retrieve the diagnostic information from the remote server. The cache refresh function will be described in detail below with reference to FIGS. 7A–7C. The cache refresh function accesses the remote server's log files, or the cache log files, as necessary, and returns the name (in the FileName parameter) of the cache log file containing the first log record to satisfy the request. At block 105 the offset to the first cache block is obtained from either the header retrieved at block 101, or from the file returned from block 104. At block 107, each block of cached log entries is accessed until either 1) the timestamp of a log entry (Field 4, Table 2) in the cache block is equal to or later than the specified begin date/time, 2) the end of the cached data is reached, or 3) the end of the file is reached. At block 110, if no log entries corresponding to the specified begin date/time were found, then at block 108 the cache refresh function is invoked. If, at block 112, the cache refresh function was unable to locate log records from the remote server or the local cache that correspond to the specified begin date/time, control transfers to block 113 where an error is reported. By "correspond" it is meant that timestamps of log entries are examined until one is found that matches the specified begin date/time, or until the specified begin date/time falls between the timestamps contained in two adjacent log entries. In the latter case, the begin date/time is changed to match the later of the two log entries.

The cache refresh function may alter the filename parameter if the first log record of the requested range is located in an archive log file, rather than in the current log file. Thus, at block 115 the file name returned from the cache refresh function, and the offset into the file of the log entry having the appropriate timestamp are stored in local variables. At block 117 analysis tool 19 determines whether the cache log file contains contiguous log entries spanning the begin and end date/time range specified by the user. If not, then at blocks 119 and 121, analysis tool 19 invokes the cache refresh function to retrieve from the remote server the appropriate log entries. At block 122, the filename and offset stored at block 115 are used to create pointers to the appropriate log file and log entry offset at which log file unpacking should begin.

Referring now to FIG. 6B, at block 124 the first log entry is read from the cache log file. At block 126 it is determined whether the user has requested filter options, i.e. that only log entries meeting a certain criteria be displayed. If so, then at block 128 it is determined whether the log entry falls within the specified criteria. If so, then at block 130 the log entry is unpacked into a text file and the pointer to the next log entry to unpack is updated. By "unpack" it is meant that the log entry is converted into a human-readable format, and that string constants are substituted for token IDs. At block 132 it is determined whether the next log entry is in the same log file. If not, then at block 134 the next file name is retrieved from the file list, which was returned by the cache refresh function. Because the cache refresh function may have had to retrieve log entries from more than one log file, the cache refresh function creates a file list containing file names of cache log files in which log entries in the requested time range exist. At block 136, it is determined whether another file name exists in the file list. If so, then at block 142 the current cache log file is closed and the next cache log file is opened. At block 144, if the file name was not successfully opened, then the process repeats at block 134. If at block 144, the next log file was successfully opened, then at block 146 the header record of the log file is opened, and the offset to the first log entry is retrieved. Control returns to block 124 where the log entry is read for unpacking. At block 138 it is determined whether the log entry has a timestamp greater than the specified end date/time. If so, then at block 140 the unpacking process ends, and the log entries are displayed to the user.

Figure 7B:
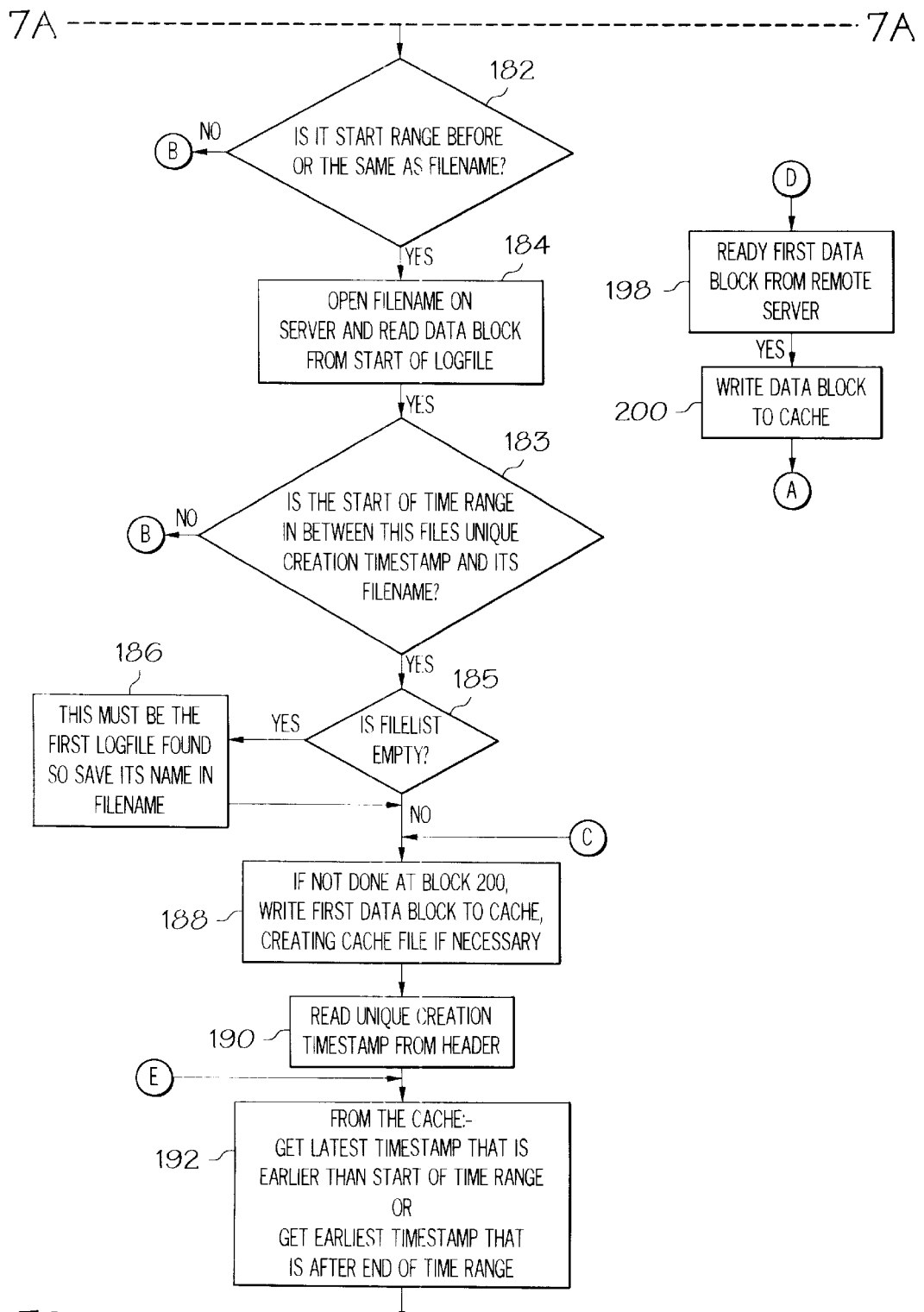
Figure 7C:
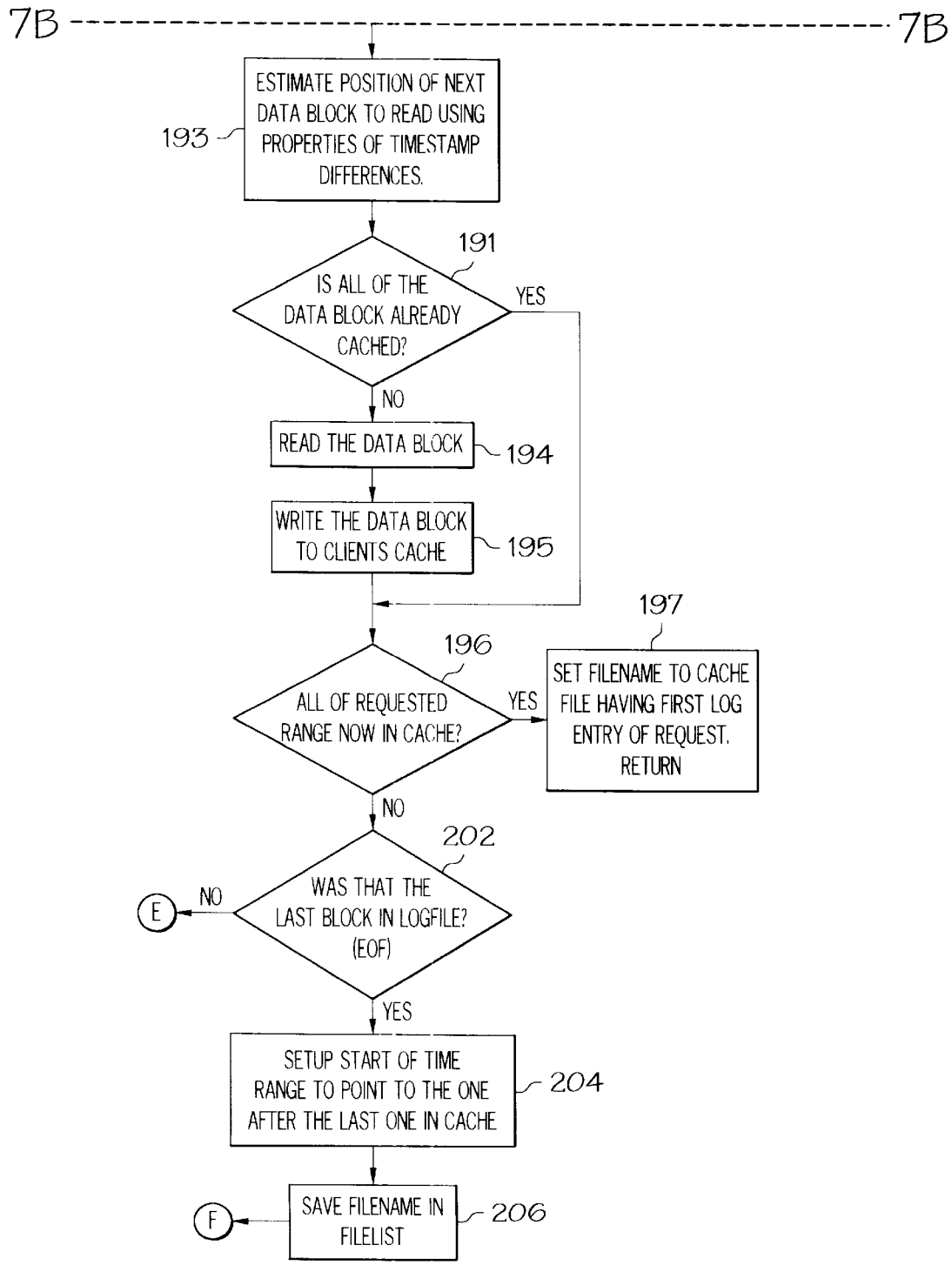

FIGS. 7A–7C are a flow diagram illustrating a method for carrying out the cache refresh function for retrieving log entries from a remote server and storing the log entries in the local cache. At block 150, the cache refresh function is invoked, for example by the log file unpacking function described in FIGS. 6A and 6B. The cache refresh function receives several parameters, which are discussed below and which are designated as "IN" if the argument is passed to the cache refresh function and not modified, "OUT" if the argument is returned by the cache refresh function, and "IN/OUT" if the value is passed in to the cache refresh function and may be modified when returned. The Server (IN) parameter indicates the particular server from which logging information is desired, the Unique ID (IN) parameter indicates a particular log entry within a log file, the Start of Time Range (IN) and End of Time Range (IN) parameters indicate the begin and end date/time ranges specified by the user, the File Offset for Next Read (IN) parameter indicates where in a cache log file the cache refresh function should begin refreshing, the Next Sequence ID (IN) parameter indicates the next sequence ID where the cache refresh function should begin refreshing, the Unique Creation Timestamp (IN) parameter identifies the unique creation timestamp of the log file from which information is desired, and the FileName (IN/OUT) parameter indicates the filename of the currently cached file. If this parameter is not set on entry into the cache refresh function, there is no current cache file associated with the server. On return from the function, the FileName parameter is set to the filename of the cached file containing the first log record which is at the specified begin date/time range. The FileList (OUT) parameter contains a list of filenames in the local persistent cache which contain the names of the cache log files which contain all the log records necessary to satisfy the request. Not all of the parameters need be set for each call to the cache refresh function, depending upon where in the unpacking process the cache refresh function is invoked. Moreover, it is apparent that the cache refresh function could use a different set of parameters to achieve the same or similar functionality as described herein. For example, the use of a Next Sequence ID is not necessary, but may be useful with certain types of logging systems.

At block 152, the log file specified in the FileName parameter is opened. At block 153 the first data block from that log file is read. The cache refresh function uses native I/O routines so the log files can be accessed regardless of the state of the distributed system. The I/O's are typically block reads of a relatively large number of bytes, such as 32 kb or 64 kb, to minimize the total number of I/O's necessary to retrieve a file over a relatively slow WAN link.

At block 154, the unique creation timestamp is obtained from the header of the log file and compared to the unique creation timestamp passed to the cache refresh function. If the timestamps do not match, then at block 156 the current cache log file associated with that remote server is copied (or renamed) into a temporary file in an archive cache directory. The archived log files on the remote server are searched for a log file having the same unique creation timestamp as the unique creation timestamp passed to the cache refresh function. If at block 160, such a log file is found, then at block 164 the temporary file created at block 156 is renamed with the same filename as the archive log file on the remote server. The matching timestamps indicate the files are the same, and renaming the cache log file eliminates the need to retransfer the log entries to the cache again. If at block 160 no log file was found having the same unique creation timestamp, then at block 162 the temporary file is deleted.

At block 166 a new current log file is created in the cache and the filename parameter is set to point to the current log file on that remote server. At block 198, (FIG. 7B) the first data block from the remote log file is read. At block 200, the data block is written to the new current log file in the cache. At block 167 (FIG. 7A) it is determined whether the begin date/time range specified by the user exists in the data block read from the remote log file. If so, control branches to block 188 (FIG. 7B). At block 190, the unique creation timestamp is read from the header.

The unique creation timestamp from the header of the log file which is currently being processed and the time contained in the file name of an archive log file provides a range of time which approximates the time range of the log records within the log file. These times can be used, in conjunction with the specified begin date/time and the timestamps of any cached log entries for this file (examined at block 192), to estimate where in the log file on the remote server the next read should occur to locate the desired log entries. This estimation is made at block 193 and is undertaken to eliminate reads of the remote log file which are unlikely to include relevant log records. This process results in a lesser number of I/Os than required to sequentially read the remote log file. If, after the estimation is made it is determined at block 191 that all of the data block has already been cached, control branches to block 196. Otherwise, at block 194, another data block is read from the remote log file. The block of data received from the remote server is written to the local cache at block 195. If, at block 196, the transferred data contained the appropriate log records, then at block 197 the process returns to the calling function. Upon the return, the FileName parameter will contain the name of the cache file having the first log entry which satisfies this request. If the transferred data does not contain the appropriate log records, then at block 202 (FIG. 7C) it is determined whether the transferred data block was the last data block in the log file. If not, another estimation (now using the timestamps from the log records in the most recently read data block) and read occurs at blocks 192–196. This process repeats until either at block 196 a data block is read which contains the requested log records, or, at block 202, the last data block in the log file is read.

At block 204 the start of time range parameter is set to be greater than the timestamp of the last log entry in the cache, and at block 206 the filename of the log file is saved in the file list parameter. Control then returns to block 168 (FIG. 7A). At block 168, if it hasn't already occurred, the cache refresh function begins examining the archived log file directory on that remote server. At block 170, the specified begin date/time is converted into a "mmddhhmm" value for comparison with the names of the log files in the archive directory. At block 172 the first, or next, (as appropriate) log file in the archive directory is examined. At block 174 this file name is saved. At block 180 it is determined whether the last file has been examined. If so, the process returns to the calling function at block 178. Upon the return, the FileName parameter will contain the name of the cache file having the first log entry which satisfies this request. If the last file has not been examined, then at block 182 it is determined whether the specified begin date/time is less than or equal to the date from the archive log file filename. If not, control returns to block 172, where the next file in the archive directory is examined. If so, control continues to block 184 (FIG. 7B) where the log file is opened and the first data block is read. At block 183 it is determined whether the specified begin date/time is between the unique creation timestamp from this log file's header and the date/time from its file name. If not, control returns to block 172 where the next archive log file is accessed. If it is, then at block 185 it is determined whether the file list is empty. If so, then at block 186 the name of the file is stored in the filename parameter. Control then begins at block 188 and continues as described above.

Analyzing and debugging distributed systems is time-consuming and complex. The diagnostic logging system according to this invention greatly reduces the time it takes to access diagnostic data relating to remote servers, in a manner which is transparent to the user of the diagnostic tool. Moreover, since diagnostic data is only transferred from the remote servers one time, network traffic is reduced. The use of native I/O allows access to the diagnostic data regardless of the state of the distributed system.

The foregoing description of preferred embodiments of the invention has been presented for purposes of illustration and description. It is not intended to be exhaustive or to limit the invention to the precise form disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A method for obtaining logging information relating to a computer, comprising:

interfacing a log file analysis tool on a first computer to a second computer;

recording logging information on the second computer;

selecting from the first computer the logging information recorded on the second computer based on a first criteria defined and selected by a user via the log file analysis tool;

determining if at least a first portion of the logging information, which is less than the entirety of the logging information, exists in a cache associated with the first computer using the log file analysis tool;

retrieving the first portion of the logging information from the cache if the first portion exists in the cache using the log file analysis tool; and retrieving the first portion of the logging information from the second computer if the first portion does not exist in the cache using the log file analysis tool.

2. A method according to claim 1, further comprising writing the first portion of the logging information to the cache if the first portion of the logging information is read from the second computer.

3. A method according to claim 1, wherein the first criteria comprises a specified range of time within which the logging information was captured on the second computer.

4. A method according to claim 3, wherein the determining step comprises:

determining if the cache includes a cache file for containing logging information within the specified range of time, and if so, reading the cache file and determining if the logging information within the specified range of time exists in the cache file.

5. A method according to claim 1, wherein retrieving the first portion of the logging information from the second computer comprises retrieving a header portion of a current log file on the second computer, determining from the header portion if the logging information exists in the current log file, and if so, retrieving the logging information from the current log file, and if not, determining which of a plurality of archive log files of the second computer contains the logging information, and retrieving the logging information from the appropriate archive log file.

6. A method according to claim 5, wherein each archive log file has a name which includes a date and a time, and wherein the name of the archive log file is examined to determine which of the plurality of archive log files contains the logging information.

7. A method according to claim 1, wherein the cache comprises a storage medium coupled to the first computer.

8. A method according to claim 1, wherein the cache comprises a storage medium accessible by the first computer over a local area network.

9. A method for maintaining log file information in a local cache, comprising:

interfacing a log file analysis tool with a remote computer;

recording log file information in the remote computer;

receiving a request from a user defining and selecting via the log file analysis tool the log file information relating to the remote computer;

examining a local cache and determining that a first portion of the requested log file information, which is less than the entirety of the logging information, is absent from the local cache using the log file analysis tool;

retrieving the first portion from the remote computer using the log file analysis tool; and storing the first portion in the local cache using the log file analysis tool.

10. A method according to claim 9, wherein the retrieving step comprises:

retrieving a header portion of a current log file from the remote computer;

determining from the header portion if the first portion exists in the current log file or in one or more of a plurality of archived log files;

retrieving the first portion from the current log file if the first portion exists in the current log file; and retrieving the first portion from one or more of the plurality of archived log files if the first portion does not exist in the current log file.

11. A method according to claim 10, wherein the requested log file information was generated within a user-specified time range, and wherein the name of each of the plurality of archived log files reflects a time, wherein the names of the archived log files are examined to determine in which archived log files the first portion exists.

12. A method according to claim 10, wherein the storing step comprises creating a cache log file in the local cache, and storing the first portion in the cache log file at an offset with respect to a beginning of the cache log file which is identical to an offset from the beginning of the respective archive log file at which the first portion within the archive log file is located.

13. A method according to claim 12, wherein the storing step further comprises merging the first portion with an existing cached portion of information in the cache log file.

14. A method for maintaining logging information for a distributed service in a cache, comprising:

interfacing a log file analysis tool with a plurality of servers;

storing, for each of the servers, logging information for each respective server on a persistent storage device associated with the respective server;

receiving a request defined and selected by a user via the log file analysis tool to access logging information relating to a particular server;

examining a cache and determining that at least a portion of the requested logging information, which is less than the entirety of the logging information, does not exist in the cache using the log file analysis tool; and retrieving the at least a portion of the requested log file information from the respective server, and storing the portion of the requested log file information in the cache using the log file analysis tool.

15. A method according to claim 14, wherein the retrieving step comprises determining if the portion of the requested log file information exists in a current log file associated with the respective server, and if so, retrieving the portion of the requested log file information from the current log file, and if not, examining at least one archive log file and retrieving the portion of the requested log file information from the at least one archive log file.

16. A method according to claim 14, wherein the storing step comprises determining if a cache file exists in the local cache which is associated with the log file on the respective server from which the portion of the requested log file information was retrieved, and if so, storing the portion in the cache file, and if not, creating a new cache file and storing the portion in the new cache file.

17. A system for obtaining logging information relating to a computer, comprising:

a log file analysis tool executing on a first computer operative to interact with a second computer;

a first processing segment executing on the first computer operative to receive a request from a user accessing the log file analysis tool to obtain logging information relating to the second computer based on a first criteria supplied by the user via the log file analysis tool;

a second processing segment operative to determine if at least a first portion of the logging information, which is less than the entirety of the logging information, exists in a cache associated with the first computer using the log file analysis tool;

a third processing segment operative to retrieve the first portion of the logging information from the cache if the first portion exists in the cache using the log file analysis tool; and a fourth processing segment operative to retrieve the first portion of the logging information from the second computer if the first portion does not exist in the cache using the log file analysis tool.

18. A system according to claim 17, further comprising a fifth processing segment operative to write the first portion of the logging information to the cache if the first portion of the logging information is read from the second computer.

19. A system according to claim 18, wherein the first criteria comprises a specified range of time within which the logging information was captured on the second computer.

20. A system according to claim 19, wherein the third processing is operative to determine if the cache includes a cache file for containing logging information within the specified range of time, and if so, to read the cache file and determine if the logging information within the specified range of time exists in the cache file.

* * * * *